United States Patent [19]

Azuma

[11] Patent Number: 4,739,726
[45] Date of Patent: Apr. 26, 1988

[54] FIXED-QUANTITY FEEDING APPARATUS FOR DOMESTIC ANIMALS

[76] Inventor: Heihachiro Azuma, c/o Tokyo Shisha Nippon Hanui Kabushiki Kaisha, No. 25-23, 3-chome, Takanawa, Minato-ku-Tokyo-to, Japan

[21] Appl. No.: 852,480

[22] Filed: Apr. 16, 1986

[51] Int. Cl.$^4$ .................................................. A01K 5/00
[52] U.S. Cl. ................................ 119/52 AF; 119/52 B; 222/330
[58] Field of Search ............... 119/52 AF, 52 B, 57; 222/330

[56] References Cited

U.S. PATENT DOCUMENTS

| 2,571,637 | 10/1951 | Weist | 119/52 B |
| 2,657,831 | 11/1953 | Pierce | 119/52 AF |
| 3,105,463 | 10/1963 | Pilch | 119/52 AF |
| 3,105,586 | 10/1963 | Carew et al. | 119/52 AF |
| 3,176,878 | 4/1965 | Aobgood et al. | 119/52 AF |
| 3,330,255 | 7/1967 | Scott et al. | 119/52 AF |
| 3,523,519 | 8/1970 | Hostetler | 119/52 AF |
| 4,154,376 | 5/1979 | Jones | 119/52 B |

Primary Examiner—John E. Murtagh
Assistant Examiner—Caroline D. Dennison
Attorney, Agent, or Firm—Millen & White

[57] ABSTRACT

An apparatus for feeding a fixed quantity of dry feed to domestic animals, comprising a pair of dry feed master hoppers, a pair of primary conveyors respectively communicated with the pair of master hoppers, a plurality of first feed box hoppers communicated with one of the primary conveyors and a plurality of the second feed box hoppers communicated with the other of the primary conveyors. A pair of secondary conveyors run parallel to each other and are respectively communicated with the first and second side feed box hoppers. Each of the secondary conveyors has a plurality of feed outlets at regular intervals in the longitudinal direction thereof. A plurality of first and second feed boxes are formed by recesses on the both side surfaces of a corrugated wall plate provided under the pair of secondary conveyors. The first feed boxes are in position to receive the dry feed supplied through the feed outlets of one secondary conveyor and the second side feed boxes are in position to receive the dry feed supplied through the feed outlets of the other secondary conveyor.

7 Claims, 4 Drawing Sheets

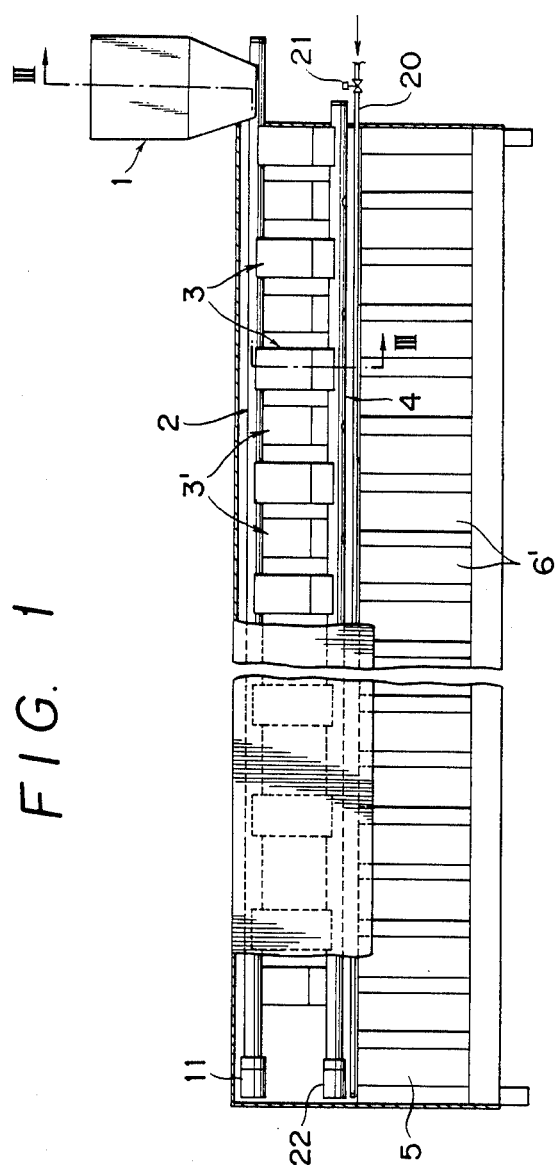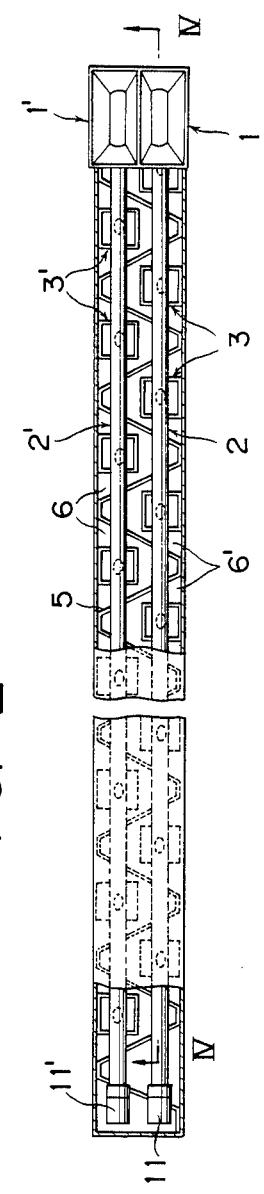

FIXED-QUANTITY FEEDING APPARATUS FOR DOMESTIC ANIMALS

BACKGROUND OF THE INVENTION

The present invention relates to a fixed-quantity feeding apparatus for domestic animals which is capable of supplying a large number of domestic animals, such as swine, etc., with the fixed quantity of dry feed.

For the purpose of providing the dry feed, powdered or granular, to a large number of domestic animals in the fixed quantity and at the regularly fixed time as well, there was conventionally used such manual method that a worker carried the dry feed to the pen for domestic animals, and put manually a roughly fixed quantity of dry feed measured by a measuring instrument into feed boxes.

However, this type of conventional manual work had such disadvantage that a great deal of time and manpower were required for feeding a large number of swine.

Further, it is not easy to utilize a controlled feeding method, that is to say, to give a large number of swine effectively and economically the appropriate quantity of feed proportionate to their growing stages.

The object of the present invention is to provide the fixed-quantity feeding apparatus which is capable of effectively carrying out the fixed-quantity feeding for a large number of domestic animals, such as swine, etc., particularly a controlled feeding for the same number of domestic animals.

SUMMARY OF THE INVENTION

According to one aspect of the present invention, there is provided an apparatus for feeding a fixed quantity of dry feed to domestic animals, comprising a pair of dry feed master hoppers and a pair of primary conveyors respectively communicated with said pair of master hoppers for transporting forwardly the dry feed discharged from said master hoppers. A plurality of first feed box hoppers communicate with one of said primary conveyors and a plurality of second feed box hoppers communicate with the other of said primary conveyors for receiving the dry feed supplied from said primary conveyors. A pair of secondary conveyors are caused to run parallel to each other and are respectively communicated with the first and second feed box hoppers for transporting forwardly the dry feed discharged from said feed box hoppers. Each of the secondary conveyors has a plurality of feed outlets at regular intervals in the longitudinal direction thereof. A plurality of first and second feed boxes are formed by the receses on both side surfaces of a corrugated wall plate provided under said pair of secondary conveyors. The first feed boxes are in positions to receive the dry feed supplied through the feed outlets of one secondary conveyor and the second feed boxes are in the positions to receive the dry feed supplied through the feed outlets of the other secondary conveyor.

Referring to said apparatus, when said primary conveyors are operated, the dry feed within the primary hoppers is transported into the primary conveyors, and the dry feed is transported through said primary hoppers into each of the feed box hoppers. The dry feed is allowed to stay therein.

Thereafter, when said secondary conveyors are operated, the dry feed within the feed box hoppers is transported into the secondary conveyors and provided in an equal quantity to said feed boxes through said feed outlets of said secondary conveyors.

If the secondary conveyors are operated, for example, for a certain fixed period of time, with every passage of fixed period of time the quantity of the feed proportionate to the operating time can be supplied to a plurality of feed boxes in an equal quantity.

Thereby, the apparatus is capable of supplying efficiently a large number of domestic animals with the fixed quantity of dry feed. Not only that, but it is capable of effectively carrying out the controlled feeding which makes it possible to give a large number of domestic animals the feed in amounts appropriate to their growing stages economically and without waste.

BRIEF DESCRIPTION OF THE DRAWINGS

Referring to the drawings, the preferred embodiment of the present invention is hereinafter described.

FIG. 1 is a view in front elevation of a part of the apparatus for giving a swine the fixed quantity of dry feed with parts broken away in order to illustrate important details.

FIG. 2 is a plane view with parts broken away.

DETAILED DESCRIPTION

Figure 3:
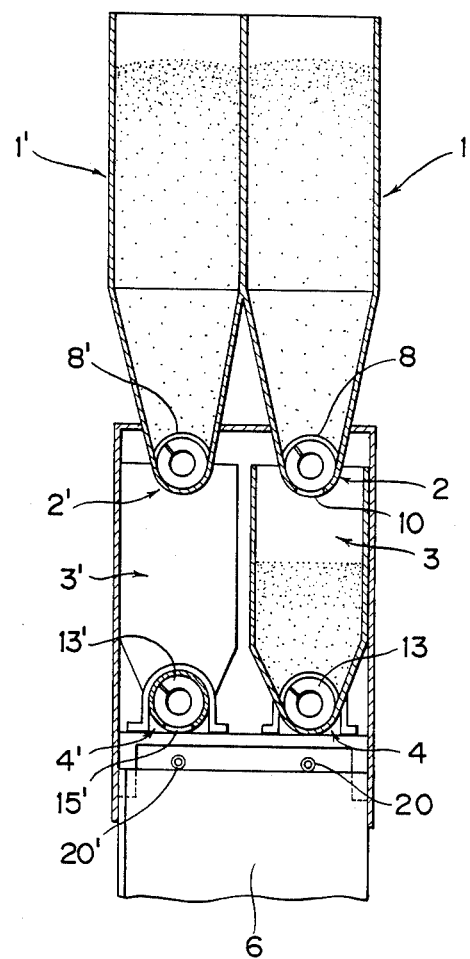
FIG. 3 is an enlarged view in section taken as indicated by the lines III—III which appear in FIG. 1.

The embodiment of the invention shown in FIGS. 1, 2 and 3 comprises a pair of fixed-quantity feeding apparatuses connected with each other. A pair of master hoppers 1 and 1' for dry feed are adjoined each other.

The rear ends of a pair of straight-type primary conveyors 2 and 2' are respectively communicated with the bottoms of master hoppers 1 and 1'.

The conveyors 2 and 2' are caused to run parallel to each other and extend horizontally. A plurality of first feed box hoppers 3 are communicated with the bottom wall of the primary conveyor 2 and a plurality of second feed box hoppers 3', with the bottom wall of another primary conveyor 2' respectively at regular intervals in the longitudinal direction of the primary conveyors. The second feed box hoppers 3' are longitudinally and laterally displaced from the first feed box hoppers 3.

A pair of straight-type secondary conveyors 4 and 4' are respectively communicated with the bottoms each of the feed box hoppers 3 and 3'. These conveyors 4 and 4' are caused to run parallel to each other and extend horizontally.

Under both of the secondary conveyors 4 and 4' are provided a plurality of feed boxes 6 with other side open and a plurality of feed boxes 6' with the one side open, which are formed by the recesses on the both side surfaces of a corrugated wall plate provided under said conveyors 4 and 4'.

It is constructed that the feed is put into the feed boxes 6 on one side from the secondary conveyor 4 and the feed is likewise put into the feed box 6' on the other side from the secondary conveyor 4'.

With respect to one of a pair of apparatuses for feeding the fixed quantity, the primary conveyor 2 is firstly described.

Figure 4:
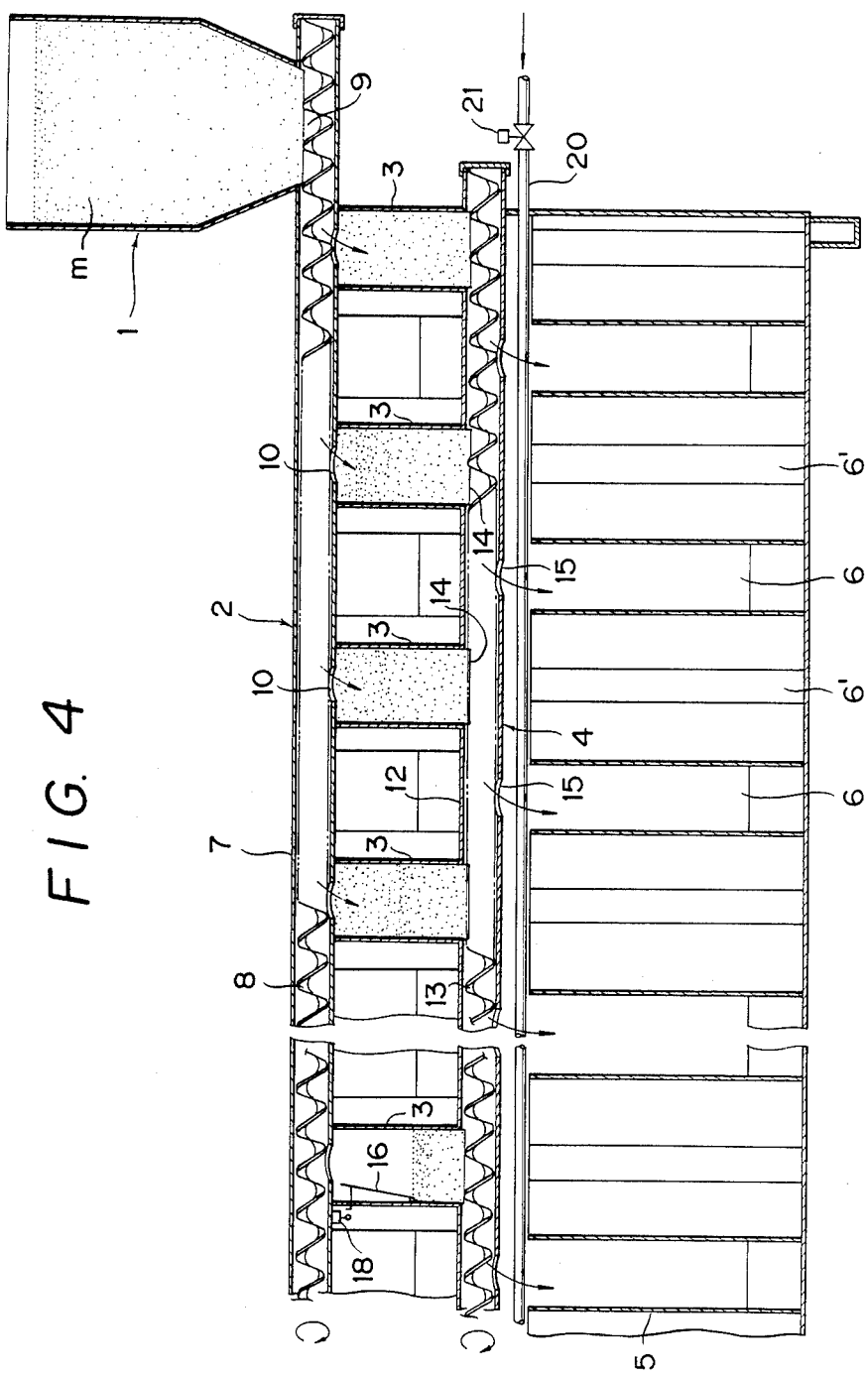
FIG. 4 is a fragmentary enlarged view in section taken as indicated by the lines IV—IV appearing in FIG. 2.
Figure 5:
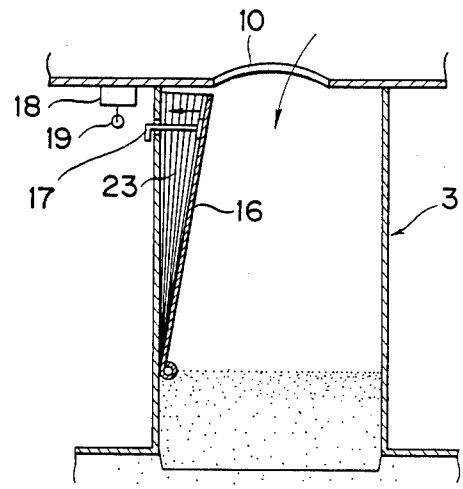
FIG. 5 is an enlarged view in elevation of the extreme left feed box hopper which appears in FIG. 4.

As shown in FIGS. 3 and 4, the helical flight 8 is rotatably positioned as the transport driving means within the transport guide cylinder 7.

The cylinder 7 is provided at the upper wall of the rear end with the feed inlet 9, which is communicated with the discharging opening at the bottom of said master hopper 1.

A plurality of feed outlets 10 are provided in a number proportionate to the number of the feed boxes 6 at the bottom wall of said cylinder 7 at regular intervals in the longitudinal direction of the cylinder 7.

The pulse motor 11 is attached to the front end of said cylinder 7 and the power axis thereof is connected with the front end of said helical flight 8.

As described in FIGS. 3 and 4, each of said feed box hoppers 3 is of the box-shaped with the receiving opening on the top and the discharging opening at the bottom.

A corrugated wall 5 separates the first feed boxes 6 from the second feed boxes 6' by defining the first feed boxes on one side of the wall and the second feed boxes on the other side.

The receiving openings of the feed box hoppers 3 are communicated with the outlets 10 of said primary conveyor 2.

As described in FIGS. 3 and 4, said secondary conveyor 4 comprises the transport guide cylinder 12 and the helical flight 13 rotatably positioned as the transport driving means within the transport guide cylinder 12.

The upper wall of the cylinder 12 is provided with the feed inlets 14, in a number proportionate to said feed box hoppers 3, at regular intervals in the longitudinal direction of said cylinder 12. Said inlets 14 are communicated with the discharging openings of said feed box hoppers 3.

At the bottom wall of said cylinder 12 are provided the feed outlets 15 in a number proportionate to feed boxes 6 at positions which are respectively forwardly dislocated at the fixed interval relative to said inlets 14 and which are respectively above the feed boxes 6.

The present example shows that said outlets 15 are located respectively in between the adjoining inlets 14.

The front end of said cylinder 12 is connected with pulse motor 22. The power axis thereof is connected with the front end of said helical flight 13.

The controlling device for supplying all feed box hoppers 3 with dry feed is as hereinafter described. The means for detecting the quantity of dry feed comprising swing plate 16 and limit switch 18 is provided on the feed box hopper 13 which is in a position farmost from said master hopper 1.

Said swing plate 16 is supported by means of a hinge at the bottom on the inner surface of the side wall of said feed box hopper 3.

Further, said swing plate 16 is provided with the striker 17 having the hook-shape tip projected on the movable upper part thereof. Said striker 17 is movably projected outside through the opening of the side wall of said feed box hopper 3.

When the dry feed within said feed box hopper 3 is decreased and requires its supply, the swing plate 16 is inclined, as shown in the drawing, due to its own weight, because the pressure from said dry feed is decreased.

The hook-shape tip of the striker 17 is caught in the side wall of the feed box hopper 3 and the swing plate remains inclined.

When the dry feed within said feed box hopper 3 is increased to a sufficient degree due to an additional supply, said dry feed would push back the swing plate. The swing plate thereby returns to the upright position.

On the other hand, when said swing plate 16 is in the nearly perpendicular position, said limit switch 18 is in an OFF position, because switch lever 19 is pushed by the tip of said striker 17.

When the swing plate 16 is inclined, as shown in the drawing, it assumes the ON position, being liberated from the push of said striker 17.

Said limit switch 18 is connected, as the switch for opening and closing the circuit, with the ordinary power circuit (not shown in the drawing) for connecting the motor 11 of said primary conveyor 2 with the power source.

In addition, both sides (left and right) of said swing plate 16 and the inner surface of feed box hopper 3 are covered by bellows 23.

Water pipe 20 is horizontally arranged between the secondary conveyor 4 and the feed boxes 6 and provided with water faucets at the bottom wall thereof in the position appropriate to feed boxes 6. One end of said pipe is connected with city water or water pump by way of electromagnetic switch 21.

In operation, when the motor 11 is started and the helical flight 8 of the primary conveyor 2 is caused to rotate in the arrow direction as described in the drawing, the dry feed(m) within the master hopper 1 is caused to move forward within the primary conveyor 2.

The dry feed is firstly thrown into the hindermost feed box hopper 3 through the hindermost outlet 10.

When the dry feed(m) is filled up within the hindermost feed box hopper 3 and reaches the outlet 10, the dry feed(m) is thrown into the new feed box hopper which is immediately next ahead of said feed box hopper. In like manner, the dry feed is successively filled up in the hopper immediately next ahead.

When the dry feed is filled up within the foremost feed box hopper 3, the swing plate 16 of the controlling device assumes the nearly perpendicular position.

Striker 17 pushes the switch lever 19, and limit switch 18 is open. Thereby, the power source circuit is open and motor 11 stopped. The primary conveyor 2 stops.

Then, when the motor 22 is started and the helical flight 13 of the secondary conveyor 4 is caused to rotate in the arrow direction as described in the drawing, the dry feed(m) within each of feed box hoppers 3 are caused to simultaneously move forward within the secondary conveyor 4.

Then, the dry feed is simultaneously put into each feed box 6 through each outlet 15 positioned in the fixed distance ahead.

After the feed is permeated all over with the secondary conveyor 4, the supply of the feed into each feed box by one rotation of said helical flight 13 is kept in the fixed quantity. Thus, every time the fixed period of time passes, the motor 22 of the secondary conveyor 4 is caused to rotate in the fixed times or for the fixed period of time. Thereby, the feed is supplied into each feed box 6 in an equal quantity, which is in conformity with the number of rotation or the time of rotation thereof.

The controlled feeding program is formulated for feeding swine in the controlled quantity appropriate to their growing stages.

There are determined the daily feeding time or frequency and the feeding quantity at each feeding time in a manner that they may be in conformity with the various growing stages of swine. Then, with reference to the operation program, there are determined the daily starting time of the secondary conveyor 4 on the basis of the daily feeding time and the number of rotation or period of rotation of the motor 22 of the secondary conveyor 4 at the starting time on the basis of the feeding quantity at the feeding time. According to this operation program, the secondary conveyor 4 is caused to start.

After each feed box 6 is supplied with dry feed, magnetic switch 21 is caused to operate, when necessary, and the feed box 6 is supplied with the fixed quantity of water through each faucet of the water pipe 20.

Thereby, the feed becomes pasty when the swine eat it. This would improve the appetite of the swine and promote their digestion to contribute to their quicker growth.

When the feed within each feed box hopper is decreased, the swing plate 16 of said controller device for supplying feed is inclined by its own weight and closes the limit switch 18.

The power circuit is closed and the motor 11 is started.

The feed is successively thrown again into each feed box hopper 3 by the primary conveyor 2. In such manner, each feed box hopper 3 is automatically filled up with the feed.

The other fixed-quantity feeding apparatus is substantially of the same structure as above.

The various parts of the same structure are indicated with the mark "dash".

In addition to the primary and secondary conveyors of the present invention, there are modifications.

One of them is a screw conveyor comprising a cylinder and a screw which are made of helical flight fixed on the circumference of the stem and which are rotatably positioned within the cylinder.

Figure 6:
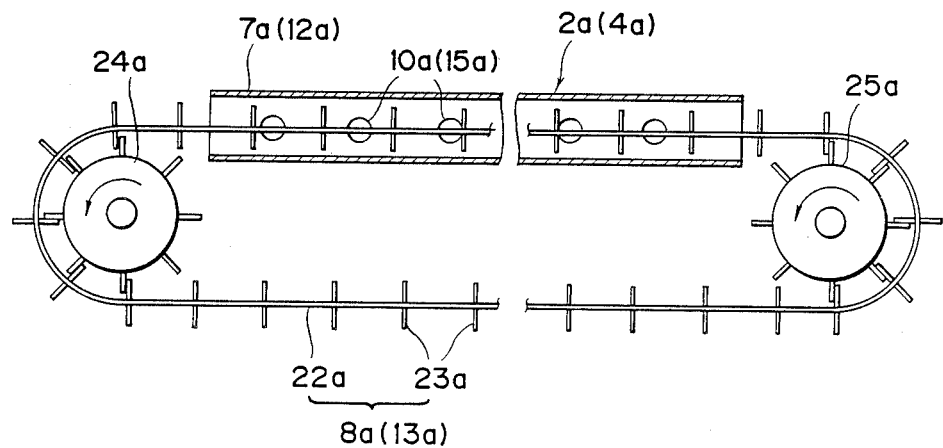
FIG. 6 is a summary plane view in section of the other embodiments of the conveyor.

There are also used the scraper conveyor as shown in FIG. 6 and the like.

The scraper conveyor 2a or 4a comprises a cylinder 7a or 12a and an endless scraper line 8a or 13a which consists of an endless flexible line 22a, such as wire, chain, etc., and a large number of scrapers 23a installed at regular intervals on said flexible line. Said endless scraper line 8a or 13a is engaged with a pair of toothed wheels 24a and 25a so that it may circulate inside and outside of the cylinder 7a or 12a.

I claim:

1. An apparatus for feeding a fixed quantity of dry feed to domestic animals, comprising
   a pair of dry feed master hoppers,
   a pair of primary conveyors extending parallel with one another in a longitudinal direction, respectively and communicating with said pair of master hoppers for transporting therefrom the dry feed discharged from said master hoppers,
   a plurality of first feed box hoppers communicating with the first primary conveyors; and a plurality of the second feed box hoppers spaced laterally and longitudinally from the first feed box hoppers and communicating with the other of said primary conveyors for receiving the dry feed supplied from said primary conveyors,
   a pair of secondary conveyors extending parallel to one another and respectively communicating with the first and second feed box hoppers for transporting forwardly the dry feed discharged from said feed box hoppers, each of the secondary conveyors having a plurality of feed outlets positioned at regular intervals in the longitudinal direction thereof, and
   a plurality of first and second feed boxes separated from one another and defined by a corrugated wall plate extending under said pair of secondary conveyors, with the first feed boxes on one side of the wall and the second feed boxes on the other side of the wall, said first feed boxes receiving the dry feed supplied through the feed outlets of one secondary conveyor and said second feed boxes receiving the dry feed supplied through the feed outlets of the other secondary conveyor.

2. An apparatus according to claim 1 wherein each of the primary and secondary conveyors consists of a guide cylinder and a helical flight rotatably positioned within said guide cylinder.

3. An apparatus according to claim 1 wherein each of the primary and secondary conveyors consists of a guide cylinder and a screw rotatably positioned within said guide cylinder.

4. An apparatus according to claim 1 wherein each of the primary and secondary conveyors consists of a guide cylinder and an endless scraper line which comprises a flexible endless line and numerous scrapers attached at regular intervals on said line and which circulates endlessly in a cycle extending inside and outside of said guide cylinder.

5. An apparatus according to claim 1 further comprising water supply means provided with a plurality of faucets for supplying said first and second feed boxes with water.

6. An apparatus according to claim 2 wherein said first and second side feed box hoppers are communicated respectively with the guide cylinders of said pair of the primary conveyors at regular intervals in the longitudinal direction of said guide cylinders, and further comprising a controlling device for supplying all feed box hoppers with the dry feed which controlling device comprises means for detecting the quantity of the dry feed within one feed box hopper in the position farthest, among feed box hoppers, from said master hopper, an electric motor for driving the primary conveyor and an electric circuit for operating and stopping said motor by means of a detecting signal from said detecting means.

7. An apparatus according to claim 6, wherein said detecting means comprises a swing plate which is swingably supported at the bottom thereof on the inner side wall within said feed box hopper, and which is inclined due to the decrease in pressure from said dry feed when the dry feed within said feed box hopper is decreased so as to be in need of a supply of feed and which assumes the upright position when the dry feed is supplied, a striker which is positioned on the swingable part of said swing plate and which projects outside through the side wall of said feed box hopper, and a limit switch positioned so as to be pushed by said striker when said swing plate assumes the upright position.

* * * * *